US006665923B2

(12) United States Patent
Phillips et al.

(10) Patent No.: US 6,665,923 B2
(45) Date of Patent: Dec. 23, 2003

(54) CLUTCH FOR A SCREW GUN AND UTILIZING METHOD

(75) Inventors: Alan Gene Phillips, Jackson, TN (US); John Robert Kriaski, Jackson, TN (US); Daniel Paxton Wall, Humboldt, TN (US)

(73) Assignee: Porter-Cable/Delta, Jackson, TN (US)

( * ) Notice: Subject to any disclaimer, the term of this patent is extended or adjusted under 35 U.S.C. 154(b) by 54 days.

(21) Appl. No.: 09/923,434

(22) Filed: Aug. 8, 2001

(65) Prior Publication Data

US 2003/0000066 A1 Jan. 2, 2003

Related U.S. Application Data

(60) Provisional application No. 60/301,450, filed on Jun. 29, 2001.

(51) Int. Cl.[7] .................. B23P 11/00; B25B 23/157
(52) U.S. Cl. .................. 29/525.11; 29/525.01; 81/475
(58) Field of Search .............. 29/525.11, 525.01, 29/525, 428, 525.05; 81/467, 473, 474, 475, 476, 58; 192/34

(56) References Cited

U.S. PATENT DOCUMENTS

| 4,453,868 A | * | 6/1984 | Winslow .................. 408/138 |
| 4,630,512 A | | 12/1986 | Durr |
| 4,655,103 A | | 4/1987 | Schreiber et al. |
| 4,774,864 A | * | 10/1988 | Dossier .................. 81/474 |
| 4,809,572 A | | 3/1989 | Sasaki |
| 4,947,714 A | | 8/1990 | Fluri |
| 5,044,233 A | | 9/1991 | Tatsu et al. |
| 5,134,909 A | | 8/1992 | Sasaki |
| 5,138,916 A | | 8/1992 | Sato et al. |
| 5,209,308 A | | 5/1993 | Sasaki |
| 5,271,471 A | | 12/1993 | Sasaki |
| 5,350,026 A | | 9/1994 | Markus et al. |
| 5,360,073 A | | 11/1994 | Akazawa |
| 5,372,206 A | | 12/1994 | Sasaki et al. |
| 5,538,089 A | | 7/1996 | Sanford |
| 5,568,849 A | | 10/1996 | Sasaki et al. |
| 5,682,800 A | | 11/1997 | Jore |
| 5,709,275 A | | 1/1998 | Neumaier |
| 5,735,183 A | | 4/1998 | Sasaki et al. |
| 5,775,186 A | | 7/1998 | Rahm |
| 5,778,989 A | | 7/1998 | Neumaier |
| 5,865,076 A | | 2/1999 | Fujiyama et al. |
| 5,881,613 A | | 3/1999 | Han |
| 5,947,210 A | | 9/1999 | Sasaki et al. |
| 6,176,162 B1 | | 1/2001 | Ludwig et al. |
| 6,536,537 B1 | | 3/2003 | Sasaki et al. |
| 6,547,013 B2 | | 4/2003 | Riedl et al. |

* cited by examiner

*Primary Examiner*—John C. Hong
(74) *Attorney, Agent, or Firm*—Hunton & Williams

(57) ABSTRACT

A clutch specially adapted for a screw gun includes an output clutch and a driving clutch. The output clutch is movable axially to engage the driving clutch. A helical spline arrangement on the driving clutch causes the driving clutch to move axially towards the output clutch a short distance when torque is transferred through the clutch. When the clutch slips and the torque is released, the driving clutch moves axially away from the output clutch a short distance and a gap is created between the output clutch and driving clutch which prevents clashing. Also, a retaining ring is mounted to an input spindle to limit the axial movement of the driving clutch.

18 Claims, 8 Drawing Sheets

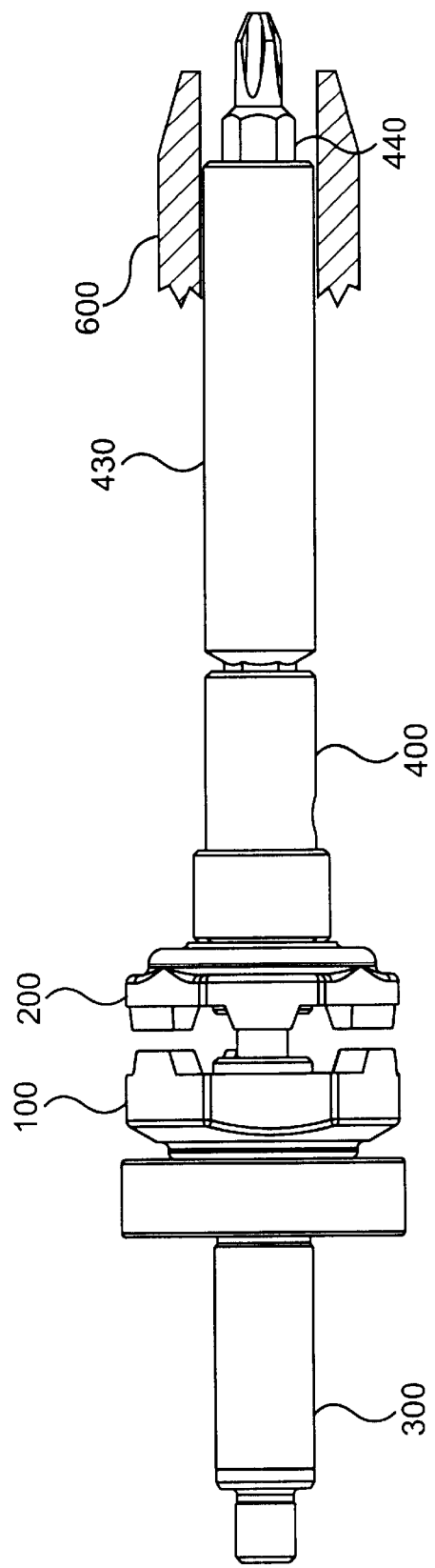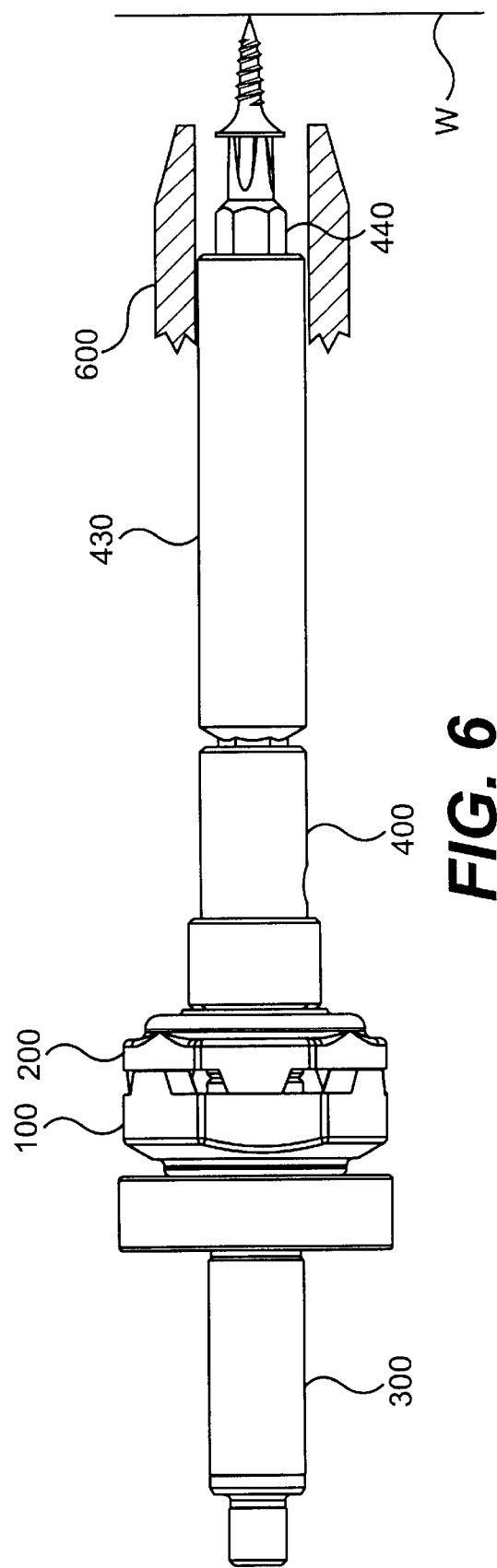

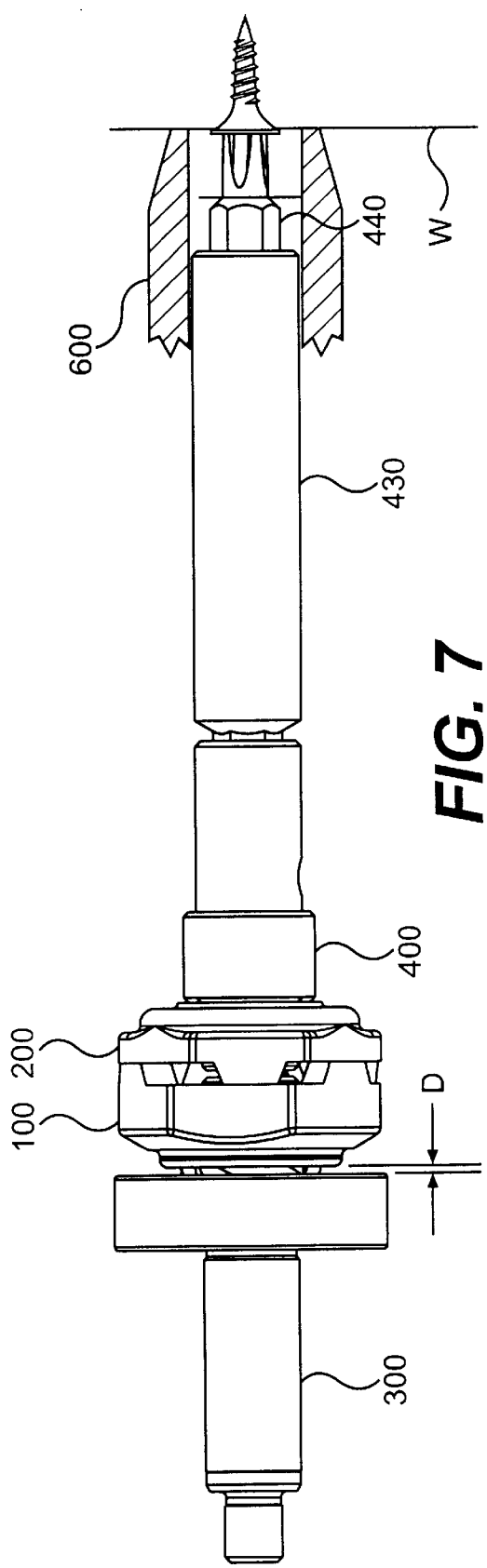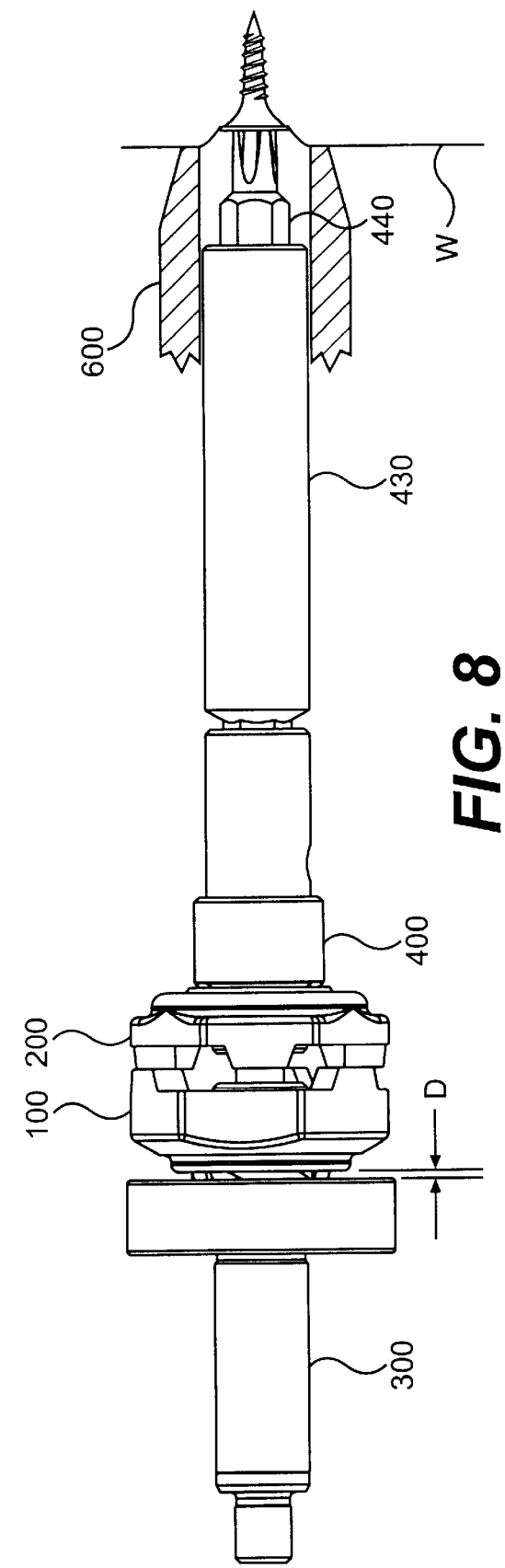

CLUTCH FOR A SCREW GUN AND UTILIZING METHOD

This application claims the benefit of the filing date of U.S. provisional application serial No. 60/301,450, filed Jun. 29, 2001.

BACKGROUND OF THE INVENTION

1. Field of the Invention

The field of this invention is clutches and more particularly clutches for screw guns.

2. Description of Related Art

The prior art includes several examples of positive disengagement clutches, or "quiet" clutches. Generally, these clutches include some mechanism for moving one of the clutch surfaces away from the other clutch surface when they disengage in order to prevent the clutch surfaces from clashing against one another.

U.S. Pat. Nos. 4,655,103, 4,809,572, and 4,947,714 are three examples each disclosing a quiet clutch for a screw gun. The '714 patent discloses a clutch with three clutching elements—a drive element, an intermediate element, and an output element. To drive a screw, all three clutch elements are initially engaged with one another (see FIG. 2 of the '714 patent). At some point while driving the screw, torque causes the intermediate element and the output element to separate from each other due to the cam surfaces 30, 15 (see FIG. 3 of the '714 patent). When the screw is almost driven to its intended depth, the intermediate element and the output element slide axially forward away from the input element, following the screw into the work piece (see FIG. 4 of the '714 patent). When the screw reaches its intended depth, the input element and the intermediate element slip. Once the slip occurs, the torque is released and the separation between the output element and the intermediate element caused by the torque and the cam surfaces 30 and 15 is no longer present. A spring positioned between the input element and the intermediate element returns the intermediate element back together with the output element. This return creates a gap "s" between the input element and the intermediate element (see FIG. 5 of the '714 patent). The gap prevents clashing of the clutch surfaces during disengagement.

While the clutch described in the '714 patent prevents clashing of the clutch surfaces during disengagement, the contact area between the intermediate element and the output element in the '714 patent decreases as the intermediate element moves away from the output element. This decrease in the contact area leads to an additional increase in the stress which arises on the intermediate element and the output element from the transfer of torque from one to the other. The increased stress can lead to a decrease in the fatigue life of each part.

SUMMARY OF THE INVENTION

It is a feature of the present invention to provide a clutch which prevents clashing of the clutch surfaces during disengagement and which is also simple and inexpensive. It is also a feature of the invention to provide a retaining ring which extends circumferentially around a first spindle in a clutch to limit the movement of a first clutch supported on the first spindle for axial and rotational movement relative thereto.

In an embodiment of the invention, a screw gun comprises a drive means, a first spindle having a first helical spline formed on a portion thereof, a first clutch having a second helical spline formed on a portion thereof so that the second helical spline engages the first helical spline of the first spindle, the first clutch being movable rotationally and axially relative to the first spindle, and a second spindle, one of the first spindle or the second spindle being driven by the drive means. A bit adapted for driving a fastener into a work piece is operatively connected to the other of the first spindle or the second spindle. A second clutch is mounted on the second spindle and rotationally fixed relative to the second spindle, the second clutch being movable in an axial direction relative to the first spindle to engage the first clutch, torque being transmittable between the first clutch and the second clutch upon engagement with one another. A spring biases the first clutch and the second clutch apart. When torque is being transmitted to the fastener in at least one direction, an axial reaction force is created between the first and second helical splines which moves the first clutch axially towards the second clutch causing the first clutch to rotate relative to the first spindle.

In another embodiment of the invention, a clutch comprises a first spindle having a first complementary engaging surface formed on an exterior cylindrical surface thereof, a first clutch having a second complementary engaging surface formed on an interior bore thereof, the first clutch supported on the first spindle at the interior bore for rotational and axial movement relative to the first spindle, with the first and second complementary engaging surfaces in engagement, and a second spindle, one of the first spindle or the second spindle being adapted to be driven by a drive means. A second clutch is mounted on the second spindle and rotationally fixed relative to the second spindle, the second clutch being movable in an axial direction relative to the first spindle to engage the first clutch, and torque being transmittable between the first clutch and the second clutch upon engagement with one another. A spring biases the first clutch and the second clutch apart. When torque is being transmitted between the first spindle and the first clutch in at least one direction, an axial reaction force is created between the first and second complementary engaging surfaces which moves the first clutch axially towards the second clutch causing the first clutch to rotate relative to the input spindle.

In another embodiment of the invention, a method of driving a fastener comprises the steps of pushing a fastener against a work piece with a screw gun which causes a first clutch and a second clutch to engage, driving the fastener into the work piece by transferring torque between the first clutch and the second clutch and then to the fastener, causing the torque which is being transferred between the first clutch and the second clutch to act upon helical splines positioned between the first clutch and a first spindle creating an axial reaction force, the axial reaction force in turn creating a small clearance distance between the first clutch and the first spindle, and disengaging the first clutch and the second clutch when the fastener is driven to the desired depth while simultaneously removing the first clearance distance between the first clutch and the first spindle and creating a second clearance distance between the first clutch and the second clutch.

In another embodiment of the invention, a clutch for a screw gun comprises a first spindle, a first clutch supported on the first spindle for rotational and axial movement relative thereto, and a second spindle, one of the first spindle or the second spindle being adapted to be driven by a drive means, the other of the first spindle or the second spindle being adapted to drive a fastener. A second clutch is attached to the second spindle for rotation therewith, the second clutch adapted to engage the first clutch and transfer torque. A retaining ring extends circumferentially around the first spindle, the retaining ring abutting a surface of the first clutch when the first clutch moves axially on the first spindle wherein the axial movement of the first clutch relative to the first spindle is limited by the retaining ring.

These and other objects, features and advantages of the invention are apparent through the detailed description of the preferred embodiments and the drawings.

BRIEF DESCRIPTION OF THE DRAWINGS

FIG. 5 is a side view of the clutch in FIG. 1 together with a sectional portion of a nosepiece for use with the clutch.

FIGS. 6–9 are side views of the clutch in FIG. 5 in various stages of engagement.

DETAILED DESCRIPTION OF THE PREFERRED EMBODIMENTS

Figure 1:
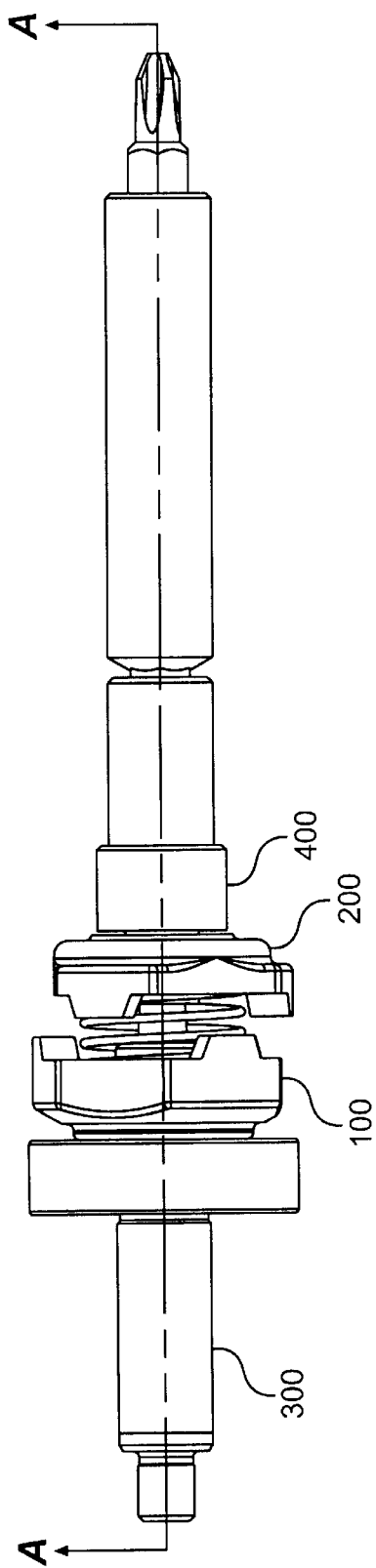
FIG. 1 is a side view of an embodiment of the clutch.
Figure 2:
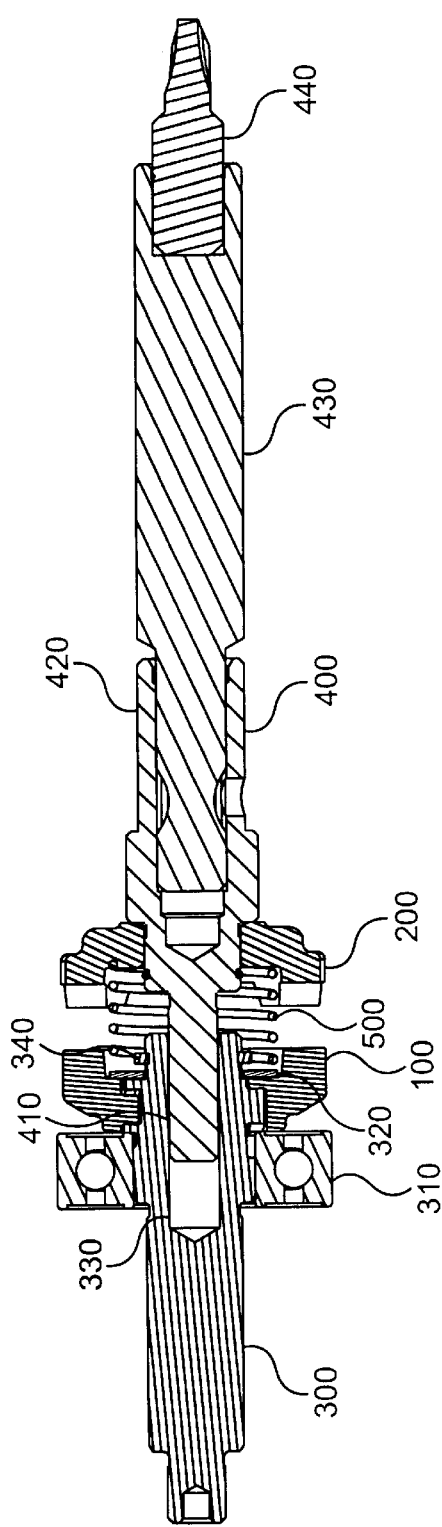
FIG. 2 is a sectional view of the clutch in FIG. 1 taken along line A—A of FIG. 1.

With reference to FIGS. 1 and 2, the clutch includes a driving clutch 100 and an output clutch 200. The driving clutch 100 and output clutch 200 are configured with mating surfaces, such as mating teeth, so that when they are engaged they are capable of transmitting torque one to another.

An input spindle 300 is driven by a driving means housed in the tool, such as an electric motor or the like. Bearing 302 supports input spindle 300 so that it can rotate relative to the tool housing. Input spindle 300 and driving clutch 100 engage one another through a helical spline assembly, as will be described in detail below.

Output spindle 400 includes an end 420 into which a bit driver 430 is detachably mounted. A bit 440 adapted for driving a screw or some other fastener is in turn detachably mounted into bit driver 430. Another end 410 of the output spindle 400 is journaled with a sliding fit inside of a bore 330 formed in the input spindle 300. The sliding fit allows output spindle 400 to rotate and freely slide axially in bore 330. The output clutch 200 is fixed to and rotates with output spindle 400. While output clutch 200 preferably does not slide axially any appreciable amount relative to the output spindle 400, it may slide axially together with output spindle 400.

A compression spring 500 biases the output clutch 200 and the output spindle 400 apart from the driving clutch 100. The respective ends of compression spring 500 push against the driving clutch 100, or an optional thrust washer 320, and the output clutch 200.

Figure 3:
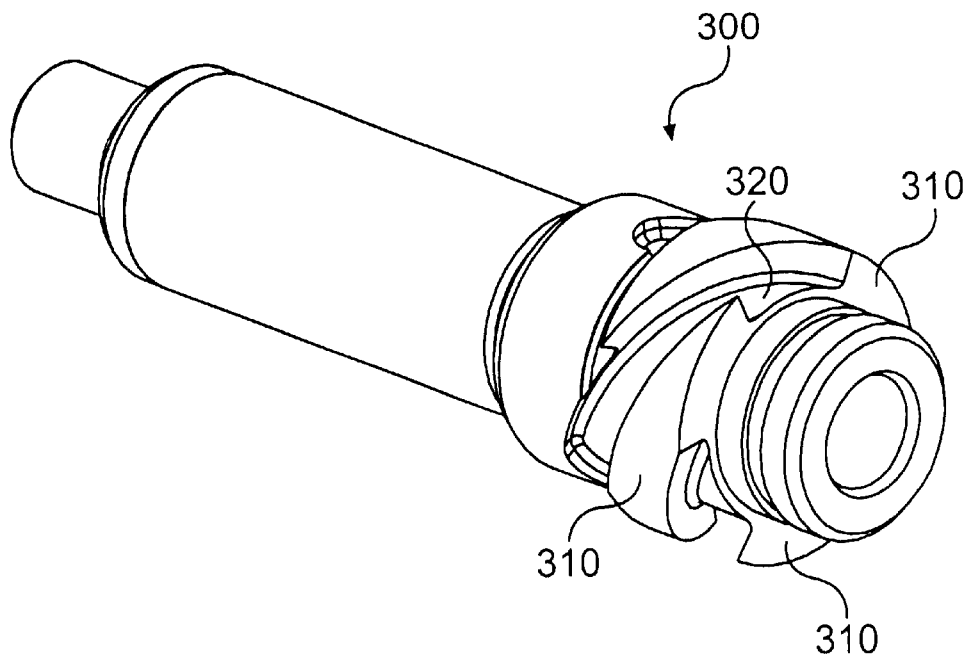
FIG. 3 is an isometric view of the input spindle for the clutch in FIG. 1.
Figure 4:
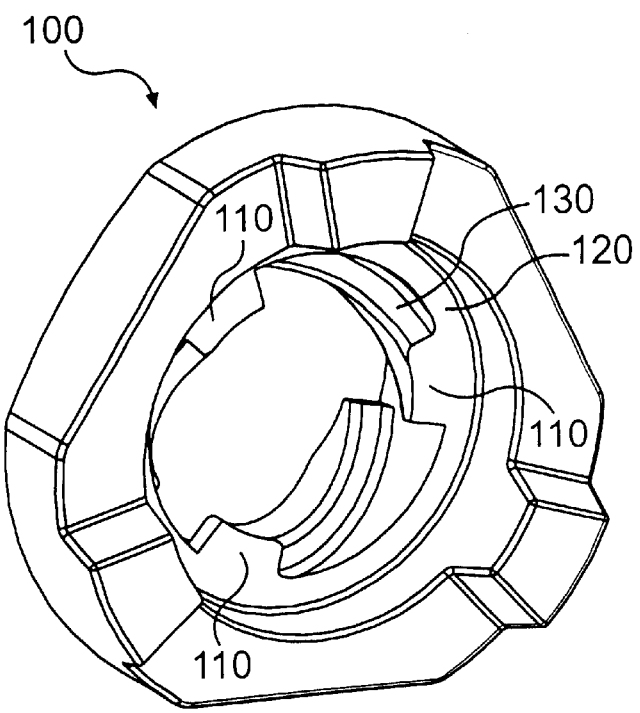
FIG. 4 is an isometric view of the driving clutch for the clutch in FIG. 1.

With reference to FIGS. 3 and 4, the input spindle 300 and the driving clutch 100 are illustrated, respectively. The input spindle 300 and the driving clutch 100 engage one another through a helical spline assembly. The driving clutch 100 has helical splines 110 formed on its interior bore 130. The input spindle 300 has corresponding helical splines 310 formed on an exterior cylindrical surface 301. The helical splines 110, 310 are sized to mesh with one another in a manner similar to the meshing of threads on a nut and bolt. When the driver is operated in the forward direction to drive a fastener, torque is transferred from the input spindle 300 to the driving clutch 100. The force at the helical splines 110, 310 caused by the torque creates an axial reaction force tending to push the driving clutch 100 axially away from the input spindle 300. When the driving clutch 100 moves axially away from the input spindle 300, the driving clutch 100 also rotates a few degrees relative to the input spindle 300. The axial movement of the driving clutch 100 relative to the input spindle 300 can be limited by a retaining ring 340 (FIG. 2) or other structure. Thrust washer 320 is optionally provided in one embodiment to ride against an annular surface 120 (FIG. 4) of the driving clutch 100 to distribute the load from the driving clutch 100 to the retaining ring 340.

Besides the illustrated helical spline assembly, the engagement between the input spindle 300 and the driving clutch 100 may be through any arrangement including complementary engaging surfaces formed on the input spindle 300 and the driving clutch 100 where the transfer of torque from one to the other causes an axial reaction force between the input spindle 300 and the driving clutch 100, and where the complementary engaging surfaces are formed on the exterior cylindrical surface 301 of the input spindle and on the interior bore 130 of the driving clutch.

Figure 12:
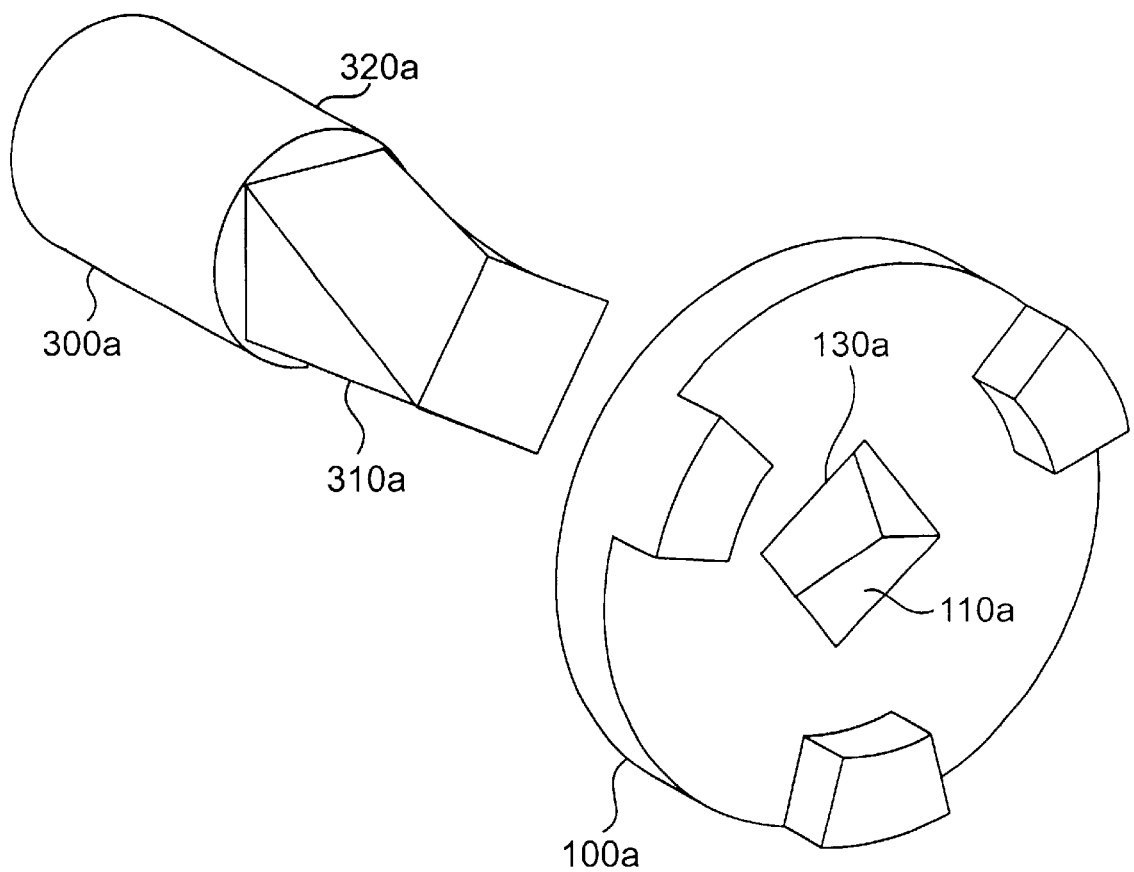
FIG. 12 is a schematic representation of another embodiment of the input spindle and the driving clutch.

For example, FIG. 12 illustrates an alternative preferred embodiment where the input spindle 300a includes a square-sectioned, helically twisted engaging surface 310a formed on its exterior cylindrical surface 301 a. The surface 310a is complementary with and engages a similarly square-sectioned, helically twisted engaging surface 110a formed on the interior bore 130a of driving clutch 100a. As with the input spindle 300 and the driving clutch 100, when the input spindle 300a transfers torque in a forward direction to the driving clutch 100a, an axial reaction force is created tending to push the driving clutch 100a away from the input spindle 300a.

One advantage of such an arrangement is that the contact area between the input spindle 300 and the driving clutch 100 remains substantially constant. Even though the driving clutch 100 moves away from the input spindle 300, the contact area does not decrease. Thus, the pressure on the contact area which arises during torque transfer does not increase due to a decrease in the contact area.

The helical splines 110 and 310 on the driving clutch 100 and the input spindle 300 can be machined. Alternatively, they may be formed in a metal injection molding, powder metal forming, or investment casting operation. The helix angle of each of the splines (measured from a plane parallel to the axis of the input spindle) is preferably between about 45° and 75°, and more preferably between about 55° and 65°, and most preferably about 60°.

In one further preferred embodiment, the driving clutch 100 and the output clutch 200 are formed from a carburizing grade steel.

Operation

Two modes of operation of the clutch will now be described.

In the first mode of operation, FIG. 5 depicts the clutch in a disengaged state, and it will be assumed that the drive means of the tool is not yet activated.

In FIG. 6, the user pushes the bit 440 and a screw or other fastener against a work piece W. This pushing force is transferred from the screw gun to the input spindle 300, to the driving clutch 100, to the thrust washer 320 and spring 500. This pushing force is also transferred from the spring 500 to the output clutch 200, output spindle 400, bit holder 430, bit 440 and finally to the screw. The pushing force compresses spring 500, causing output spindle 400 and output clutch 200 to slide axially closer to the driving clutch 100 and input spindle 300. Eventually, when the pushing force is great enough, the driving clutch 100 and the output clutch 200 begin to engage. When the driving clutch 100 and output clutch 200 begin to engage, they are ready to transfer torque. When the driving clutch 100 and the output clutch 200 are fully engaged, the pushing force is directly transferred between them.

When the driving means is activated, torque is applied to the input spindle 300 and in turn is transferred to the driving clutch 100, the output clutch 200, the output spindle 400, the bit holder 430, the bit 440 and finally to the screw, rotating each of these components together. The screw is thereby driven into the work piece W.

In FIG. 7, at some point while driving the screw, the torque transferred through the input spindle 300 and driving clutch 100 becomes great enough that the reaction force resulting from the torque on the helical splines 310, 110 causes driving clutch 100 to rotate slightly relative to the input spindle 300 and move axially away from the input spindle 300 by a small distance D, until the driving clutch 100 and the thrust washer 320 (FIG. 2) abut retaining ring 340 (FIG. 2). This movement of the driving clutch 100 also causes the output clutch 200, output spindle 400, bit holder 430 and bit 440 to slide axially forward a small amount.

Eventually the screw is driven to a predetermined depth and an end of the nosepiece 600 abuts the work piece W, as depicted in FIGS. 7 and 8. The user's pushing force against the screw gun is then transferred through the nosepiece 600 to the work piece W, and no longer through the clutch. With the user's pushing force no longer fully compressing spring 500, the output spindle 400 and the output clutch 200 are pushed axially away from the driving clutch 100 and input spindle 300 as the screw is driven further into the work piece W. In one embodiment, the output spindle 400 and the output clutch 200 are pushed axially away from the driving clutch 100 and input spindle 300 by a reaction force created at the surface of sloped mating teeth formed on the mating surfaces of each of the output clutch 200 and driving clutch 100. As output clutch 200 moves axially away from the driving clutch 100, it begins to disengage from driving clutch 100, as depicted in FIG. 8.

Figure 9:
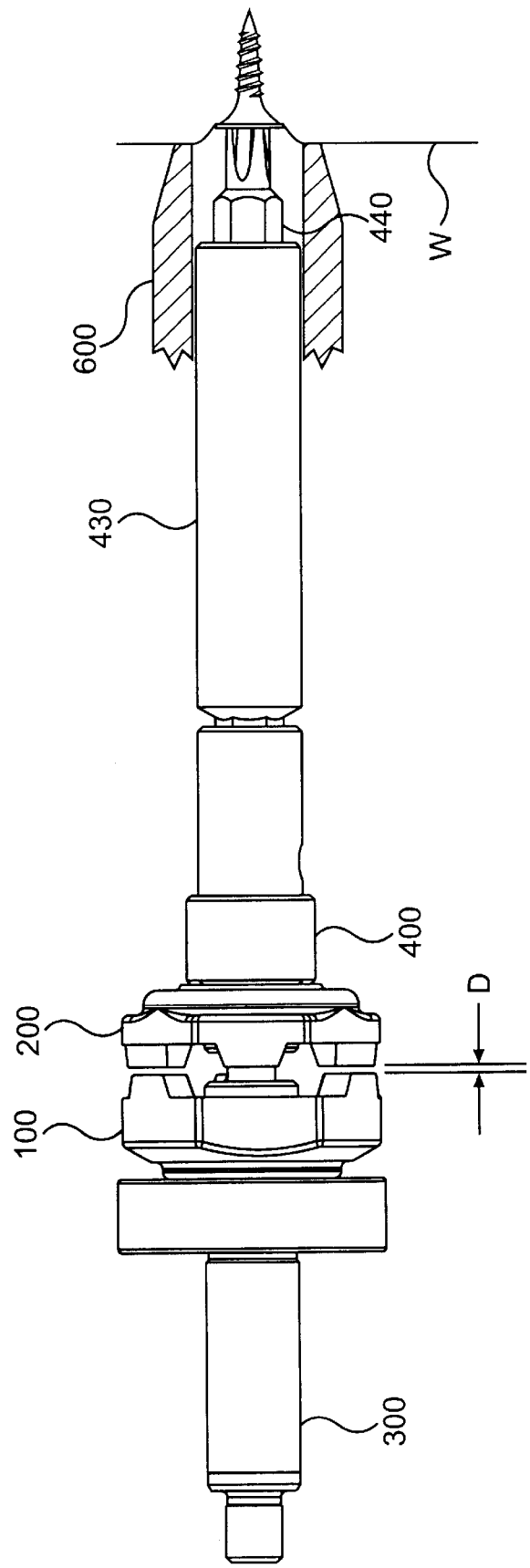

Eventually, the mating surfaces of output clutch 200 move just beyond the mating surfaces of driving clutch 100 and they slip and disengage. At the instant they slip, the torque transmitted from the input spindle 300 to the driving clutch 100 is released. When the torque is released, the reaction force from the helical splines 110, 310 which pushes the driving clutch 100 axially away from the input spindle 300 is also released. Once this reaction force is released, spring 500 pushes the thrust washer 320 and the driving clutch 100 back into their original positions relative to input spindle 300 so that there is no longer a distance D separating them. This motion also moves driving clutch 100 axially away from the output clutch 200, creating a new clearance distance D between the two output clutch 200 and the input clutch 100, as depicted in FIG. 9. This clearance distance D ensures a clean disengagement of the clutch and reduces clashing.

In the second mode of operation, FIG. 5 depicts the clutch in a disengaged state, and it will be assumed that the drive means of the tool is already activated. This mode of operation is commonly employed by tradesmen who lock the screw gun in its "ON" position during continuous use for driving one fastener after another in rapid succession.

When the user pushes a screw against a work piece W with the screw gun, as in FIG. 6, output clutch 200 moves toward engagement with driving clutch 100, as in the first mode. Since the drive means is already activated, input spindle 300 and driving clutch 100 are already rotating. As soon as driving clutch 100 and output clutch 200 begin to engage, output clutch 200 and output spindle 400 immediately begin to rotate along with driving clutch 100 and input spindle 300 and the screw is driven into work piece W.

As in the first mode, at some point while driving the screw, the torque transferred through the input spindle 300 and driving clutch 100 becomes great enough that the reaction force resulting from the torque on the helical splines 310, 110 causes driving clutch 100 to move away from input spindle 300 by a small distance D, as depicted in FIG. 7. From this point forward, the clutch will continue to operate as described in the first mode until the clutch disengages.

Besides simplicity, this design includes other advantages not present in the prior art. For example, the retaining ring 340, shown in FIG. 2, is advantageously placed on the input spindle 300 so that at the time when the driving clutch 100 and thrust washer 320 contact retaining ring 340, the retaining ring 340 rotates at the same speed as driving clutch 100. In the design disclosed in U.S. Pat. No. 5,538,089, an annular projecting shoulder 88 (see FIG. 1 of the '089 patent) is formed in the clutch housing and bears against annular shoulder 56 on the intermediate clutch. The projecting shoulder 88 stops the forward axial movement of the intermediate clutch, but also causes friction as the clutch housing does not rotate and the intermediate clutch rotates at a high speed. The disclosure suggests that a journal bearing 89 can be placed between the projecting shoulders 88 and 56, but heat and wear are nevertheless created by the friction resulting from the contact. Retaining ring 340 disclosed herein produces substantially no heat or wear. Retaining ring 340 must be able to withstand the axial force placed upon it by the driving clutch 100. To this end, two alternative embodiments are proposed in FIGS. 10–11 which may provide an increased fatigue life for the clutch.

Figure 10A:
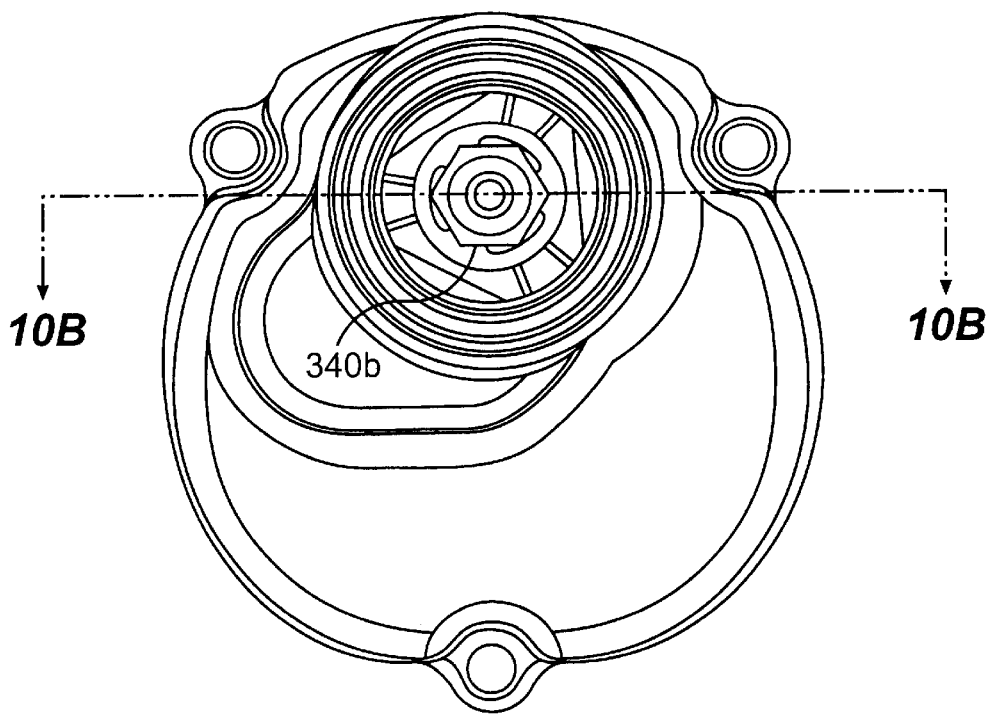
FIGS. 10A–10B are views of a preferred embodiment including a first alternative to the retaining ring for the clutch in FIG. 1.
Figure 10B:
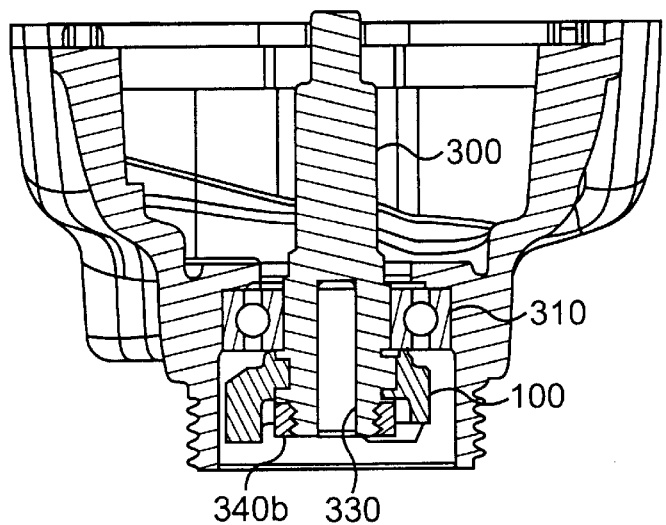

FIGS. 10A–10B illustrate a preferred embodiment which includes a first alternative to retaining ring 340: a nut 340b. Nut 340b is threaded on its inside diameter. The outside diameter of the input spindle 300 has complementary threads in this embodiment so that nut 340b is held onto input spindle 300 with a threaded connection. The threaded connection provides additional strength to keep nut 340b securely positioned on the input spindle 300 during the life of the tool.

Figure 11B:
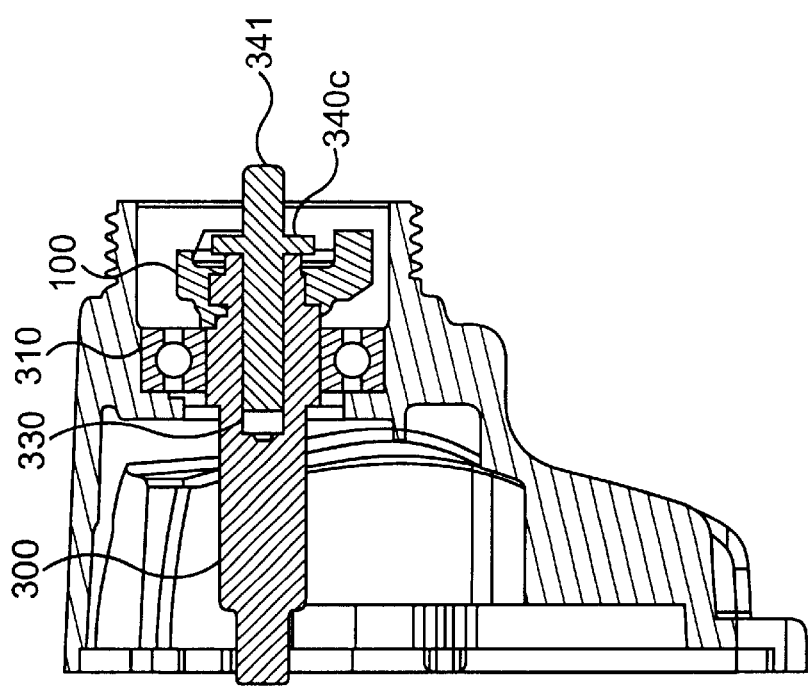
FIGS. 11A–11B are views of a preferred embodiment including a second alternative to the retaining ring for the clutch in FIG. 1.
Figure 11A:
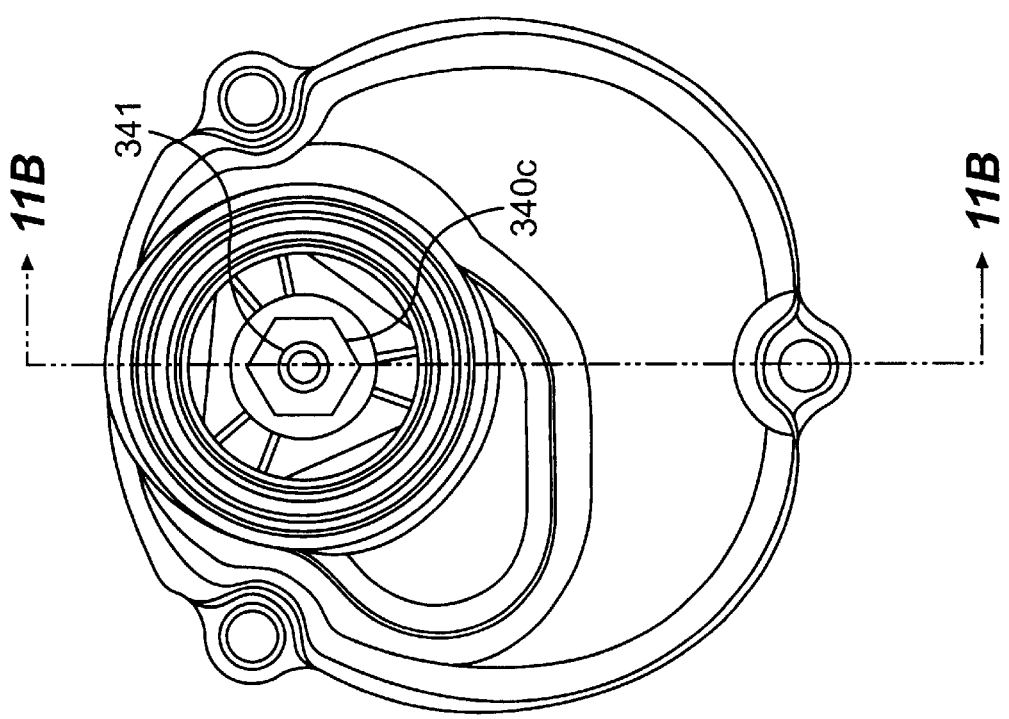

FIGS. 11A–11B illustrate a preferred embodiment which includes a second alternative to retaining ring 340: a flange 340c on a stud 341. One end of stud 341 is sized to fit inside of bore 330 of input spindle 300. Bore 330 has threads formed therein and one end of stud 341 has complementary threads which engage the threads of bore 330 to form a threaded connection between input spindle 300 and stud 341. Flange 340c is formed as an annular shoulder on the other end of stud 341 opposite the threaded end. In this embodiment, output spindle 400 would be formed with a bore in one end sized so that stud 341 can be journaled in the bore and the output spindle 400 can be rotationally supported by stud 341.

Thus an improved clutch for a screw gun has been disclosed which disengages quietly with reduced clashing, is simple and inexpensive, and has a good fatigue life.

Although the invention has been described in relation to certain preferred embodiments, the invention is not limited to these embodiments. Many possible variations of this clutch may be realized without departing from the scope of the invention as defined by the claims. For example, in lieu of the helical spline arrangement between the input spindle 300 and the driving clutch 100, the output clutch 200 may be connected to the output spindle 400 through a helical spline. Such an arrangement would be essentially a reversal of the arrangement illustrated in FIG. 2. Other alternatives are within the scope of the preferred embodiments and shall be regarded as equivalents.

We claim:

1. A screw gun comprising:
a drive means;
a first spindle having a first helical spline formed on a portion thereof;
a first clutch having a second helical spline formed on a portion thereof so that the second helical spline engages the first helical spline of the first spindle, the first clutch being movable rotationally and axially relative to the first spindle;
a second spindle, one of the first spindle or the second spindle being driven by the drive means;
a bit adapted for driving a fastener into a work piece, the bit being operatively connected to the other of the first spindle or the second spindle; and
a second clutch mounted on the second spindle and rotationally fixed relative to the second spindle, the second clutch being movable in an axial direction relative to the first spindle to engage the first clutch, torque being transmittable between the first clutch and the second clutch upon engagement with one another.

2. The screw gun according to claim 1 further comprising:
a spring biasing the first clutch and the second clutch apart; and
wherein when torque is being transmitted to the fastener in at least one direction, an axial reaction force is created between the first and second helical splines which moves the first clutch axially towards the second clutch causing the first clutch to rotate relative to the first spindle.

3. The screw gun according to claim 2,
wherein the second clutch is fixed to the second spindle.

4. The screw gun according to claim 2,
wherein the spring seats on one end against the first clutch and seats on a second end against the second clutch.

5. The screw gun according to claim 2 further comprising,
a retaining ring extending circumferentially around the first spindle, the retaining ring abutting a surface of the first clutch when the first clutch moves axially toward the second clutch, wherein
the axial movement of the first clutch away from the first spindle is limited by the retaining ring.

6. The screw gun according to claim 2,
wherein the helix angle of the first helical spline and the second helical spline is between about 45° and 75°.

7. The screw gun according to claim 2,
wherein the helix angle of the first helical spline and the second helical spline is between about 55° and 65°.

8. The screw gun according to claim 2,
wherein the helix angle of the first helical spline and the second helical spline is about 60°.

9. A clutch assembly comprising:
a first spindle having a first complementary engaging surface formed on an exterior cylindrical surface thereof;
a first clutch having a second complementary engaging surface formed on an interior bore thereof, the first clutch supported on the first spindle at the interior bore for rotational and axial movement relative to the first spindle, with the first and second complementary engaging surfaces in engagement;
a second spindle, one of the first spindle or the second spindle being adapted to be driven by a drive means;
a second clutch mounted on the second spindle and rotationally fixed relative to the second spindle, the second clutch being movable in an axial direction relative to the first spindle to engage the first clutch, torque being transmittable between the first clutch and the second clutch upon engagement with one another;
a spring biasing the first clutch and the second clutch apart; and
wherein when torque is being transmitted between the first spindle and the first clutch in at least one direction, an axial reaction force is created between the first and second complementary engaging surfaces which moves the first clutch axially towards the second clutch causing the first clutch to rotate relative to the first spindle.

10. The clutch assembly according to claim 9, wherein the second clutch is fixed to the second spindle.

11. The clutch assembly according to claim 9, wherein the spring seats on one end against the first clutch and seats on a second end against the second clutch.

12. The clutch assembly according to claim 9 further comprising, a retaining ring extending circumferentially around the first spindle, the retaining ring abutting a surface of the first clutch when the first clutch moves axially toward the second clutch, wherein
the axial movement of the first clutch relative to the first spindle is limited by the retaining ring.

13. The clutch assembly according to claim 9, wherein the first and second complementary engaging surfaces each have at least one helix portion which is helically formed around the rotational axis of the input spindle; and
the helix angle of the helix portions is between about 45° and 75°.

14. The clutch assembly according to claim 13, wherein the helix angle of the helix portions is between about 55° and 65°.

15. The clutch assembly according to claim 13, wherein the helix angle of the helix portions is about 60°.

16. A clutch assembly for a screw gun comprising:

a first spindle;

a first clutch supported on the first spindle for rotational and axial movement relative thereto;

a second spindle, one of the first spindle or the second spindle being adapted to be driven by a drive means, the other of the first spindle or the second spindle being adapted to drive a fastener;

a second clutch attached to the second spindle for rotation therewith, the second clutch adapted to engage the first clutch and transfer torque;

a retaining ring extending circumferentially around the first spindle, the retaining ring abutting a surface of the first clutch when the first clutch moves axially on the first spindle; and wherein the axial movement of the first clutch relative to the first spindle is limited by the retaining ring.

17. A method of utilizing a screwgun clutch comprising:

engaging a first clutch and a second clutch by pushing a fastener against a work piece with a screw gun;

transferring torque and rotational movement between the first clutch and the second clutch and then to the fastener in order to drive the fastener into the work piece;

causing the torque which is being transferred between the first clutch and the second clutch to act upon complementary engaging surfaces positioned between the first clutch and a first spindle creating an axial reaction force, the axial reaction force in turn creating a small clearance distance between the first clutch and the first spindle; and disengaging the first clutch and the second clutch when the fastener is driven to a desired depth while simultaneously removing the first clearance distance between the first clutch and the first spindle and creating a second clearance distance between the first clutch and the second clutch.

18. The method of utilizing a screwgun clutch of claim 17, wherein the small clearance distance between the first clutch and the first spindle is created in response to the axial reaction force, a contact area between the first spindle and the first clutch that existed prior to the creation of the small clearance distance does not substantially decrease when the clearance distance has been created.

* * * * *